United States Patent [19]

Jeandeau

[11] Patent Number: 5,223,969
[45] Date of Patent: Jun. 29, 1993

[54] SCANNING METHOD AND APPARATUS FOR AN OPTO-ELECTRONIC CAMERA HAVING HIGH RESOLUTION AND A LARGE FIELD OF VIEW

[75] Inventor: Serge Jeandeau, Ste-Genevieve-Des-Bois, France

[73] Assignee: Societe Anonyme dite: Aerospatiale Societe Nationale Industrielle, Paris, France

[21] Appl. No.: 897,011

[22] Filed: Jun. 11, 1992

[30] Foreign Application Priority Data

Jun. 14, 1991 [FR] France ............... 91 07334

[51] Int. Cl.$^5$ ............................................. G02B 26/08
[52] U.S. Cl. ................................. 359/196; 359/876; 356/147
[58] Field of Search ............. 359/196, 201, 202, 220, 359/221, 872, 876; 356/138, 140, 147, 148; 250/234, 235, 236

[56] References Cited

U.S. PATENT DOCUMENTS

| | | | |
|---|---|---|---|
| 4,300,160 | 11/1981 | Pusch et al. | 359/876 |
| 4,639,081 | 1/1987 | O'Brien | 359/876 |
| 4,678,289 | 7/1987 | Mattelin et al. | 359/876 |
| 4,680,522 | 7/1987 | St. Clair et al. | 359/876 |
| 4,838,632 | 6/1989 | Manian | 359/221 |

FOREIGN PATENT DOCUMENTS 0170317 2/1986 European Pat. Off. .
3005427 8/1981 Fed. Rep. of Germany .

OTHER PUBLICATIONS

Patent Abstracts of Japan, vol. 9, No. 195, 8 Apr. 1985–No. 60-60524.

*Primary Examiner*—Loha Ben
*Attorney, Agent, or Firm*—Marshall, O'Toole, Gerstein, Murray & Borun

[57] ABSTRACT

A scanning method and apparatus for an opto-electronic camera having a wide field of view and high resolution, wherein:

for each value given to the angle of the deflector about the first axis of rotation the square of the value of the angle of the deflector about the first axis of rotation is calculated;

a correction is added to the value of the angle of the deflector relative to its rotation about the second axis of rotation, the correction being in the form of a quantity proportional to the square of value of the angle of the deflector relative to its rotation about the first axis of rotation, thereby obtaining a corrected value for the angle of rotation, thereby obtaining a corrected value for the angle of the deflector relative to the second axis of rotation; and the deflector is positioned relative to the second axis of rotation by applying the corrected value of the angle of the deflector.

3 Claims, 3 Drawing Sheets

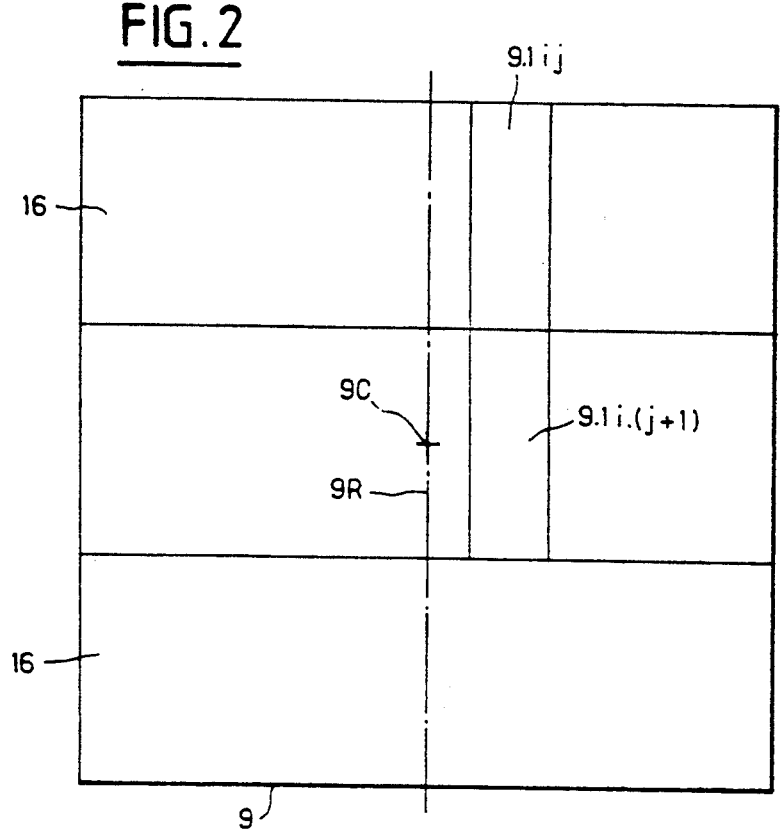
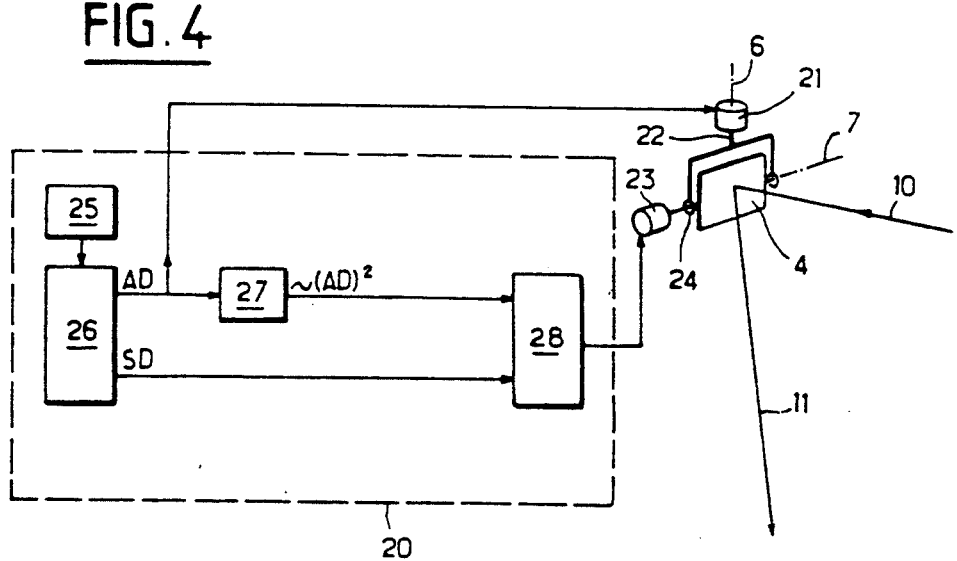

SCANNING METHOD AND APPARATUS FOR AN OPTO-ELECTRONIC CAMERA HAVING HIGH RESOLUTION AND A LARGE FIELD OF VIEW

The present invention relates to a scanning method and apparatus for an opto-electronic camera having high resolution and a large field of view. It is particularly, but not exclusively, suitable for such cameras that are sensitive to infrared radiation.

BACKGROUND OF THE INVENTION

It is known that opto-electronic cameras having high resolution and a large field of view generally comprise a strip of photo-sensitive elements (infrared detector), or sometimes a matrix of such photosensitive elements. The photosensitive detector is disposed in the focal plane of an optical device that achieves the desired resolution.

In cameras of this type, the image of the field of view in the focal plane is large relative to the dimensions of the photosensitive detector, thereby making it impossible to take a picture of the entire field of view at a single instant. A moving device for deflecting a light beam is therefore provided, e.g. constituted by at least one mirror, serving to cause the entire image of the field to pass over the detector in the focal plane. In other words, the photosensitive detector constituted by a strip of point photosensitive elements disposed in a plurality of lines and in a few tens or hundreds of columns constitutes a rectangle whose length extends along a constant azimuth angle, over which a strip of the observed field is caused to pass, which strip moves perpendicularly to the length of the rectangle, i.e. azimuth scanning is performed. The image of a different, adjacent strip, is acquired in the same manner by taking up a different elevation angle.

The overall image is thus obtained by juxtaposing a plurality of such strips.

In order to perform such scanning, the deflection device may be constituted, for example, by a mirror that rotates about a first axis of rotation passing substantially through the center of the mirror and disposed so as to be colinear with the axis of the optical device, with rotation about the first axis of rotation defining azimuth displacement relative to the observed field; the mirror is also capable of rotating about a second axis of rotation also passing through the center of the mirror and perpendicular to the first axis of rotation, with the rotary position of the mirror about the second axis defining an elevation displacement relative to the observed field.

For example, the observed field may be scanned in full by giving successive different values to the angle of inclination of the deflection device about the second axis of rotation, and at each of the different angle values, causing the angle of the deflection device to vary continuously between two predetermined extreme values about the first axis of rotation.

In order to ensure that the resolution and the sensitivity of the image obtained from the detector are optimal, it is necessary to ensure that each photosensitive element belonging to a given line of the detector scans the same elements in the observed field by virtue of the motion of the deflector.

Unfortunately, in large-field cameras of the type described above, rotation of the deflection device causes the image of the detector to rotate relative to the observed field about an axis perpendicular to the plane thereof through an angle equal to the angle of rotation of the deflection device about the first axis.

The greater the field, the greater the angle of rotation.

This rotation therefore causes each point in the field to be focused at a position that is dispersed over a plurality of lines of the detector.

An object of the present invention is to remedy this drawback.

SUMMARY OF THE INVENTION

To this end, the present invention provides a method of scanning a field observed by a plane photosensitive detector comprising a plurality of columns of photosensitive elements, the scanning being performed by means of an optical deflector that receives an incident beam and directs a deflected beam towards the photosensitive detector through focusing optics, the deflector being suitable for rotating both about a first axis of rotation colinear with the axis of the focusing optics and about a second axis of rotation perpendicular to the first axis of rotation, the method is remarkable in that:

for each value given to the angle of the deflector about the first axis of rotation the square of the value of the angle of the deflector about the first axis of rotation is calculated;

a correction is added to the value of the angle of the deflector relative to its rotation about the second axis of rotation, the correction being in the form of a quantity proportional to the square of value of the angle of the deflector relative to its rotation about the first axis of rotation, thereby obtaining a corrected value for the angle of the deflector relative to the second axis of rotation; and the deflector is positioned relative to the second axis of rotation by applying the corrected value of the angle of the deflector.

Thus, when the azimuth angle of the beam is varied, the elevation angle of the beam is corrected so that the light beam scans approximately over an arc of a circle centered on the first axis defining the azimuth angle of the beam. A correction is thus imparted to the motion of the deflection device such that the observed field moves perpendicularly to the column direction of the photosensitive elements. The trajectory angle of successively observed points of the field on the photosensitive detector thus no longer depends on the orientation of the optical deflector, thereby eliminating loss of sensitivity due to a trajectory which is not perpendicular to the columns of photosensitive elements.

The deflector is preferably a mirror and the correction is equal to one-fourth of the square of value of the angle of the mirror about the first axis of rotation.

To implement the method of the invention, the invention provides an apparatus disposed in front of focusing optics directed onto a detector provided with a photosensitive surface comprising a plurality of columns of photosensitive elements, the scanning device comprising:

an optical deflector receiving an incident beam and directing a deflected beam towards the detector, the optical deflector having a first hinge enabling it to rotate about a first axis of rotation that is colinear with the optical axis of the focusing optics, and having a second hinge enabling it to rotate about a second axis of rotation perpendicular to the first axis of rotation;

a first actuator suitable for driving the deflector to rotate about the first axis of rotation;

a second actuator suitable for driving the deflector to rotate about the second axis of rotation; and a calculator suitable for controlling the first and second actuators respectively;

the apparatus being remarkable in that the calculator includes correction means suitable for calculating and applying a correction to the second actuator for each angle of the incident light beam relative to rotation about the first axis of rotation, the correction being proportional to the square of the value of the angle of the incident light beam relative to rotation of the deflector about the first axis of rotation.

Such a device thus makes it possible, at least approximately, to ensure that the path of the image of the photosensitive surface over the observed scene is perpendicular to the columns of detectors while the detector is rotating about its first axis of rotation, and that this applies regardless of the angle about the second axis of rotation.

BRIEF DESCRIPTION OF THE DRAWINGS

The figures of the accompanying drawings show clearly how the invention can be implemented. In these figures, identical references designate items that are similar.

FIG. 2 shows how the observed field is scanned.

FIG. 4 shows the deflector together with its control means and its actuator means.

DETAILED DESCRIPTION

Figure 1:
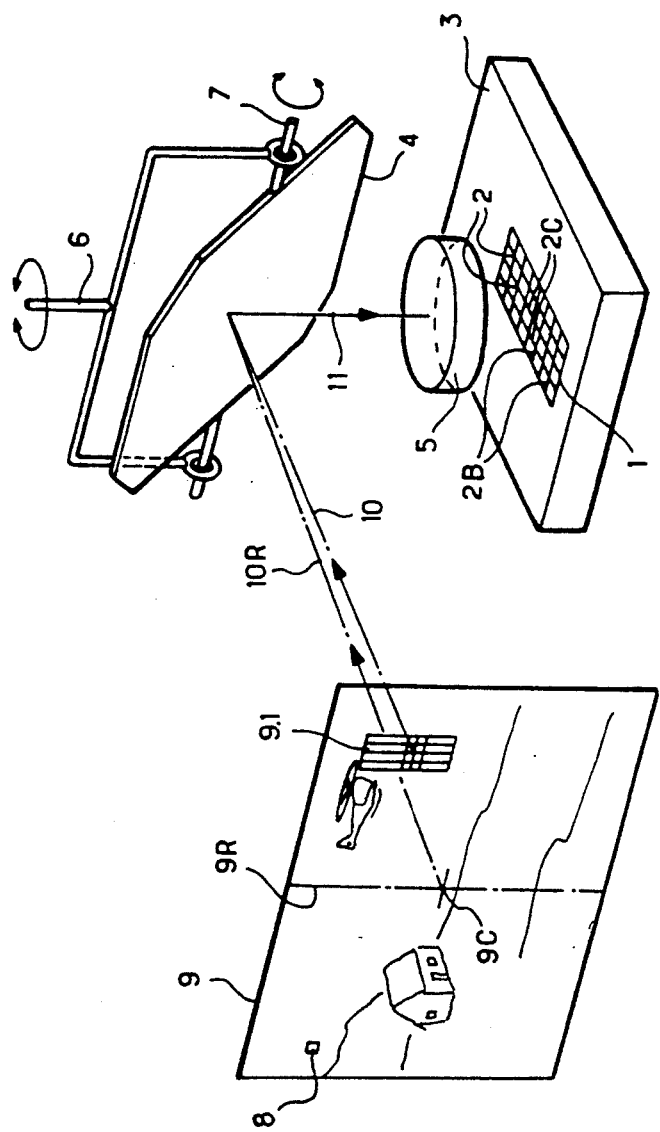
FIG. 1 is a diagram of a camera of the invention.

The camera shown in FIG. 1 comprises a detector 1 having a photosensitive surface made up of photosensitive elements 2 disposed in lines 2B and in columns 2C.

A frame 3 carries the photosensitive detector 1, a light beam deflector 4, and a focusing optical system 5. The deflector 4 is rotatable about two axes of rotation; a first axis of rotation 6 passing substantially through the center of the deflector 4 and colinear with the axis of the focusing optics 5; and a second axis of rotation 7 which is both perpendicular to the first axis of rotation 6 and parallel to the plane of the deflector 4. The angular position of the deflector 4 while it rotates about the first axis of rotation 6 determines the azimuth angle of the deflector relative to various points 8 in an observed field 9. Similarly, the angular position of the deflector 4 as it rotates about the second axis of rotation 7 determines an elevation angle of the deflector. The observed field 9 is assumed to be rectangular and a reference axis 9R is defined as passing through the center 9C of the image of the field 9 along an angle of constant azimuth. The operation of the device can be likened to scanning a plane surface delimited by the field 9 and perpendicular to the reference axis 9R. A spherical projection of a landscape is formed on the plane surface, with the center of projection being the point where the two axes of the deflector 4 coincide. The image formed on the surface thus constitutes the image of the landscape as seen by the photosensitive detector 1 via the deflector 4 and the focusing optics 5. By using the deflector 4 to scan the image of the field 9, it is possible for the surface of the detector 1 to receive in succession the image of various points 8 in the observed field 9, each of which points emits an elementary beam, with the set of the elementary beams constituting an incident beam 10 which is deflected by the deflector 4 and which passes through the focusing optics 5 to become a deflected beam 11 reaching the photosensitive elements 2 on the surface of the detector 1, with the size of each of the photosensitive elements defining the resolution of the scanning system. Using the principle of reciprocal light propagation, the scanning of the field by the deflector 4 can thus be considered in terms of causing an image 9.1 of small angular extent to scan over the field 9 which is of large angular extent, where the image 9.1 represents the projection of the photosensitive area of the detector 1 on the field 9. The orientation of the incident beam 10 is specified firstly by an azimuth angle of the beam it contains relative to the azimuth angle of the reference beam 10R, and secondly by an elevation angle of the beam it contains relative to the elevation angle of the reference beam 10R. When the deflector 4 is a mirror, then the elevation angle of the beam varies twice as much as the elevation angle of the deflector.

Thus, the azimuth angle of the incident beam 10 is zero when the image of the surface to be detected 1 corresponds to a position situated on the reference axis 9R, whereas the elevation angle of the beam is zero for an incident beam 10 having the same elevation angle as the reference beam 10R that passes through the center 9C of the image of the field 9.

The azimuth angle of the deflector has the same zero reference as the azimuth angle of the beam, and is therefore proportional thereto.

At any given instant, the surface of the photosensitive detector 1 receives the portion 9.1$ij$ of the observed field as delimited by the outline of the image of the surface of the detector 1 as projected back onto the field 9, after passing via the deflector 4, and as shown in FIG. 2. The deflector 4 displaces the position of this image continuously within the field 9, thereby scanning the field perpendicularly to the length of the surface of the detector 1, thereby obtaining a strip 16 (which is horizontal in the present case), the scanning being repeated for j juxtaposed strips 16, with each strip being scanned using a new elevation angle, as shown in FIG. 2.

Thus, rotating the deflector 4 about the first axis of rotation 6 and about the second axis of rotation 7 makes it possible to observe a field 9 that has a large angle of view.

Figure 3:
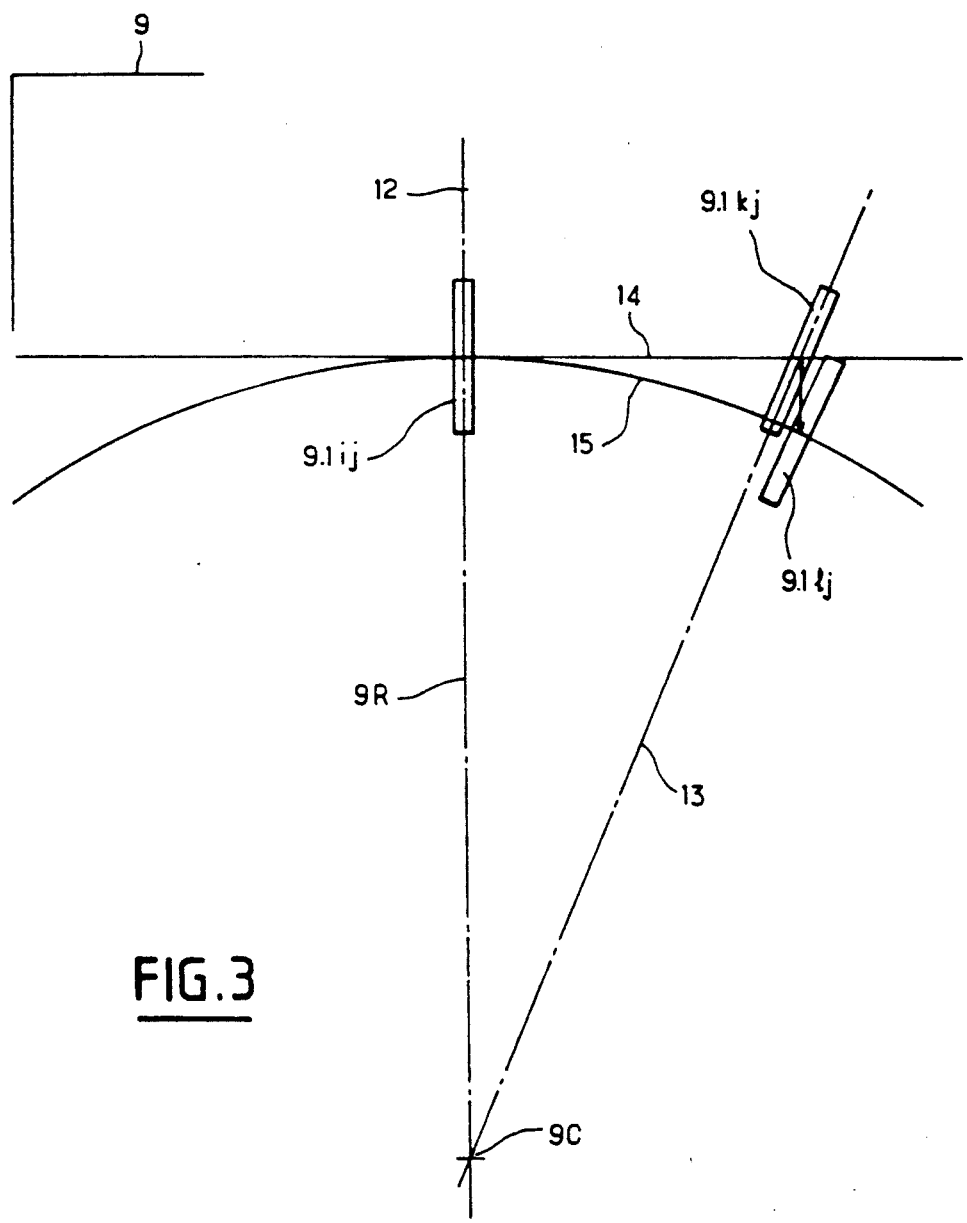
FIG. 3 shows how the correction applied to the elevation angle of the deflector is varied in accordance with the invention.

The above description relates to the theoretical operation of the device shown in FIG. 1. In practice, its true operation is somewhat different since the orientation of the image 9.1 depends on the azimuth angle. FIG. 3 shows the effect of varying the azimuth angle of the deflector 4 on the orientation of the image of the detector 1 as formed on the image of the field 9. An image 9.1$ij$ of the surface of the detector 1 at constant azimuth angle and situated in the center of the observed field 9 defines a flat rectangle whose length extends along a first image straight line 12 at constant beam azimuth angle in the image of the observed field 9, the first image straight line 12 coinciding with the reference axis 9R. Another image 9.1$kj$ of the surface of the detector 1 on the image of the field 9, corresponding to some other azimuth angle of the deflector, gives a second flat rectangle whose length is parallel to a second image straight line 13 which is at some angle to the first image straight line 12.

If a third image straight line 14 is drawn in the plane of the field 9 perpendicular to the reference axis 9R, the line corresponds to a line of image points at a constant beam elevation angle. It can thus be seen that an image such as 9.1$kj$ has an orientation that rotates with increasing angle between the corresponding incident beam 10 relative to a perpendicular to the plane of the image of the field 9, such as reference beam 10R. As a result, displacing the image 9.1$ij$ at constant elevation angle takes place parallel to the third image straight line 14, which displacement is no longer perpendicular to the length of the rectangle delimiting the image 9.1$ij$. This means that a point 8 in the observed field which might have been detected by a single photosensitive element 2 in one of the columns 2C had the point been situated in the center of the field 9, runs the risk of being detected by two photosensitive elements 2 situated on two adjacent lines 2B.

The present invention seeks to cancel this spread created by relative rotation between the scanning direction and image straight lines such as the second image straight line 13 corresponding to a constant beam azimuth angle.

In accordance with the invention, to obtain instantaneous displacement of the image 9.1$kj$ of the detector 1 over the surface of the image of the field 9 in a direction that is perpendicular to the length of the rectangle forming the image of the columns of strips 1C, an image straight line at constant elevation angle, such as the third image straight line 14, is transformed into a circular arc 15 that is tangential to the third image straight line 14 where it intersects the reference axis 9R.

Thus, the image 9.1$ij$ of the surface of the detector 1 on the field 9 moves along circular arc 15, thereby ensuring that it moves perpendicularly to the length of the rectangle, and thus also to the columns 2C of photodetector elements.

This transformation of the trajectory is a correction which is performed by translation parallel to the reference axis 9R through an amplitude that is defined below. The amplitude of this correction increases with increasing absolute value of the azimuth angle, i.e. with increasing distance from the point where the image straight line 14 is tangential to the circular arc 15.

To do this, a correction is applied to the beam elevation angle as a function of the beam azimuth angle. A suitable optimum correction consists in correcting the elevation angle of the beam by an amount proportional to the square of the value of the beam azimuth angle, with all angles being expressed in radians.

The correction must obey a quadratic law as a function of the beam azimuth angle in order to be able to transform a straight line into a circle, this is because the correction is equivalent to translating a point on the image straight line 14 parallel to the reference axis 9R to a corresponding point on the circular arc 15 through an amplitude equal to the difference between unity and the cosine of the beam azimuth angle, with the main term of a limited expansion of the difference being equal to one-half the square of the beam azimuth angle.

In addition, the amplitude of the correction determines the radius of curvature of the circular arc 15, with the circle corresponding to the arc 15 being centered on the center 9C and with its radius being equal to the distance between the center 9C and the image straight line 14 tangential to the circular arc 15.

When the deflector 4 is a mirror, this result is obtained by increasing the elevation angle of the deflector by an amount equal to one-fourth of the square of the azimuth angle of the deflector since the azimuth angle of the beam is equal to the azimuth angle of the deflector, while for any variation in the elevation angle of the deflector, the mirror will cause twice that variation in the elevation angle of the beam.

Thus, any azimuth scanning motion of the deflector 4 is associated with corrective motion of the deflector 4 in elevation through an angle such as to obtain a correction in the beam elevation angle that corresponds to the value calculated as mentioned above. It is not essential for the deflector 4 to give rise to variation in the elevation angle deflection that is twice the variation in the elevation angle of the deflector: depending on the type of deflector used, the elevation angle correction applied to the deflector is chosen to be appropriate for obtaining the desired correction in the elevation angle of the beam.

It is therefore necessary to perform simultaneous rotation both in azimuth and in elevation, which requires the ability to calculate the elevation correction in real time.

A scanning device of the invention is shown in FIG. 4. A calculator 20 controls both a first actuator 21 carried by the frame 3 causing the deflector 4 to rotate about a first hinge 22 on its first axis of rotation 6, and a second actuator 23 carried by the frame 3 causing the deflector 4 to rotate about a second hinge 24 about its second axis of rotation 7.

All of the points 8 in the field 9 are scanned, for example, by selecting a reference value for the elevation angle of the deflector relative to a zero azimuth angle of the deflector, i.e. a non-corrected value for the elevation angle of the deflector, and then using the selected reference value to calculate an elevation angle correction for the deflector for each rectangle 9.1 in the observed field, and controlling the direction in which the deflector 4 points as a function of the corrected value, thereby making it possible to obtain the desired correction of the elevation angle of the beam. In addition, the azimuth angle of the deflector is given a sequence of successive values causing it to scan between first and second previously determined extreme values on either side of its zero value, while making use of the calculator 20 to calculate the correction to be applied to the elevation angle of the deflector at each of the successive values taken up by the azimuth angle of the deflector, with the correction being applied by means of the second actuator 23.

These operations are repeated as often as necessary for performing azimuth scans, taking account of the length of the rectangle 9.1 relative to the elevation dimension of the field 9, so as to scan the entire field 9 once.

The calculator 20 includes a sequencer 25 which provides it with a scanning time frame suitable for ensuring that the various operations required for obtaining an image of the field 9 are performed appropriately.

The calculator 20 is thus capable of associating any specific position 9.1$ij$ of a rectangle with a specific instant within the scanning time frame Thus, at the beginning of the scanning time frame, the calculator sets a first predetermined extreme reference value for the elevation angle of the deflector and uses the first actuator 21 to control a scan between the first and second extreme values of the azimuth angle of the deflector. At each time position within the time frame, the calculator 20 is thus capable of calculating the correction that should be applied to the elevation angle of the deflector, since at each such position it knows the value of the reference elevation angle of the deflector, i.e. the non-corrected elevation angle of the deflector and also the value of the azimuth angle of the deflector.

Once a scan has been performed at a constant reference value for the elevation angle of the deflector for one strip of rectangles 9.1*ij*, the same sequence of operations is repeated for an adjacent value of the reference elevation angle of the deflector, after an appropriate command has been transmitted to the second actuator 23, thereby causing a strip of rectangles 9.1*i*(j+1) to be scanned adjacent to those that have just been scanned, and this is done until a second predetermined reference extreme value of the elevation angle of the deflector is reached, corresponding to the end of the time frame.

To do this, a memory 26 addressed by the sequencer 25 and receiving the the time frame is addressed at each instant within the time frame and delivers a reference value SD for the elevation angle of the deflector together with a value AD for the azimuth angle of the deflector. This azimuth angle value AD for the deflector is applied to the first actuator 21 and to a calculation means 27 of the calculator 20, thereby obtaining one-fourth of the square thereof (assuming that the deflector 4 is a mirror deflecting the elevation angle of the beam through a value equal to twice the variation in its own elevation angle), thus providing the value for the correction to be applied to the reference value of the beam elevation angle. An adder 28 of the calculator 20 receives the correction value and it adds it to the reference value of the deflector elevation angle SD as obtained from the memory 26. The adder 28 thus provides a corrected value for the deflector elevation angle, which corrected value is applied to the second actuator 23.

In addition, since the correction is a good approximation to the theoretical value only when the angle of incidence of the incident beam 10 on the surface of the field 9 is not too far from the perpendicular, the correction becomes less accurate with decreasing angle of incidence, which means that under such circumstances, it may be more advantageous to provide an accurate correction at large deflections of the incident beam 10 even at the cost of accepting a limited amplitude error on angles close to normal incidence. This may lead to use some weighting coefficient on the theoretical value of the square of the azimuth angle of the deflector other than one-fourth, thereby obtaining a circle 15 having a different radius.

I claim:

1. A method of scanning a field observed by a plane photosensitive detector comprising a plurality of columns of photosensitive elements, the scanning being performed by means of an optical deflector that receives an incident beam and directs a deflected beam towards said photosensitive detector through focusing optics, said deflector being suitable for rotating both about a first axis of rotation colinear with the axis of said focusing optics and about a second axis of rotation perpendicular to the first axis of rotation, wherein:

for each value given to the angle of the deflector about said first axis of rotation the square of the value of said angle of the deflector about said first axis of rotation is calculated;

a correction is added to the value of the angle of the deflector relative to its rotation about said second axis of rotation, said correction being in the form of a quantity proportional to the square of value of the angle of the deflector relative to its rotation about the first axis of rotation, thereby obtaining a corrected value for the angle of the deflector relative to the second axis of rotation; and said deflector is positioned relative to the second axis of rotation by applying said corrected value of the angle of the deflector.

2. A method according to claim 1, in which said deflector is a mirror, and wherein said correction is equal to one-fourth of the square of value of the angle of said mirror about said first axis of rotation.

3. Apparatus disposed in front of focusing optics directed onto a detector provided with a photosensitive surface comprising a plurality of columns of photosensitive elements, said apparatus comprising:

an optical deflector receiving an incident light beam and directing a deflected light beam towards said detector, said optical deflector having a first hinge enabling it to rotate about a first axis of rotation that is colinear with the optical axis of said focusing optics, and having a second hinge enabling it to rotate about a second axis of rotation perpendicular to said first axis of rotation;

a first actuator suitable for driving said deflector to rotate about said first axis of rotation;

a second actuator suitable for driving said deflector to rotate about said second axis of rotation; and a calculator suitable for controlling said first and second actuators respectively;

wherein said calculator includes correction means suitable for calculating and applying a correction to said second actuator for each angle of the incident light beam relative to rotation about the first axis of rotation, said correction being proportional to the square of the value of said angle of the incident light beam relative to rotation of the deflector about the first axis of rotation.

* * * * *